(12) United States Patent
Rantala

(10) Patent No.: US 10,385,464 B2
(45) Date of Patent: Aug. 20, 2019

(54) TRANSITION METAL OXIDE PARTICLES AND METHOD OF PRODUCING THE SAME

(71) Applicant: Inkron Ltd, Hong Kong (HK)

(72) Inventor: Juha Rantala, Hong Kong (HK)

(73) Assignee: Inkron Ltd, Hong Kong (HK)

( * ) Notice: Subject to any disclaimer, the term of this patent is extended or adjusted under 35 U.S.C. 154(b) by 165 days.

(21) Appl. No.: 14/915,263

(22) PCT Filed: Aug. 28, 2014

(86) PCT No.: PCT/FI2014/050659
§ 371 (c)(1),
(2) Date: Feb. 29, 2016

(87) PCT Pub. No.: WO2015/028718
PCT Pub. Date: Mar. 5, 2015

(65) Prior Publication Data
US 2016/0215401 A1    Jul. 28, 2016

Related U.S. Application Data

(60) Provisional application No. 61/870,799, filed on Aug. 28, 2013.

(30) Foreign Application Priority Data

Aug. 28, 2013 (FI) ...................................... 20135869

(51) Int. Cl.
*H01M 4/50* (2010.01)
*C25B 1/21* (2006.01)
(Continued)

(52) U.S. Cl.
CPC ................ *C25B 1/21* (2013.01); *C25B 15/08* (2013.01); *H01M 4/50* (2013.01); *H01M 4/502* (2013.01);
(Continued)

(58) Field of Classification Search
None
See application file for complete search history.

(56) References Cited

U.S. PATENT DOCUMENTS 4,295,943 A * 10/1981 Tomov ...................... C25B 1/21
205/541
2002/0155351 A1* 10/2002 Licht ...................... H01M 4/34
429/219
(Continued)

FOREIGN PATENT DOCUMENTS

CN    102242373 A    11/2011
EP    2677066 A1    12/2013
(Continued)

OTHER PUBLICATIONS

Adelkhani H et al: Nano-structural tailoring of manganese dioxide by using pulse current electrodeposition. SSI, NHPC. vol. 179, No. 39. Dec. 15, 2008.
(Continued)

*Primary Examiner* — Wyatt P McConnell
(74) *Attorney, Agent, or Firm* — Seppo Laine Oy

(57) ABSTRACT

This application relates to oxide particles, preferably transition metal oxide particles, made via the application of a voltage across an electrolyte solution. The electrolyte solution includes a transition metal salt dissolved in water, and preferably also includes a compound for increasing the electrical conductivity of the electrolyte. The particles made by the processes disclosed herein, can have sizes in the micrometer or nanometer ranges. The oxide particles can have a variety of uses, including for charge storage devices. As an example, manganese oxide particles, and methods for making the same, are disclosed for a variety of uses including lithium ion batteries.

18 Claims, 3 Drawing Sheets

(51) Int. Cl.
*C25B 15/08* (2006.01)
*H01M 10/0525* (2010.01)
*H01M 10/0569* (2010.01)
*H01M 4/02* (2006.01)

(52) U.S. Cl.
CPC ... *H01M 10/0525* (2013.01); *H01M 10/0569* (2013.01); *H01M 2004/028* (2013.01); *H01M 2220/20* (2013.01); *H01M 2220/30* (2013.01); *H01M 2300/0028* (2013.01)

(56) References Cited

U.S. PATENT DOCUMENTS

| | | |
|---|---|---|
| 2004/0108220 A1 | 6/2004 | Stephan et al. |
| 2012/0093680 A1 | 4/2012 | Los et al. |
| 2013/0199673 A1 | 8/2013 | Yanson et al. |
| 2014/0202874 A1* | 7/2014 | Elgammal ............... C25B 1/00 205/555 |

FOREIGN PATENT DOCUMENTS

| | | |
|---|---|---|
| JP | 2002533288 A | 10/2002 |
| JP | WO2012090749 A1 | 6/2014 |
| WO | WO0027754 A1 | 5/2000 |
| WO | WO0037714 A1 | 6/2000 |
| WO | WO2012111766 A1 | 8/2012 |

OTHER PUBLICATIONS

D E Simon et al: A close look at electrolytic manganese dioxide (EMD) and the [gamma]-MnO 2 & [epsilon] -MnO 2 phases using rietveld modeling. Jan. 1, 2004.
Ghaemi M et al: Effects of dorect and pulse current on electrodeposition of magnese dioxide. JOPS, ES, vol. 111, No. 2. Sep. 23, 2002.

* cited by examiner

TRANSITION METAL OXIDE PARTICLES AND METHOD OF PRODUCING THE SAME

TECHNICAL FIELD

The present invention relates to metal oxide particles, to uses thereof and to the production of the particles. In particular, the present invention concerns transition metal oxide particles which are prepared via the application of a voltage across an electrolyte solution.

BACKGROUND

Metal oxides and in particular manganese oxides ($MnO_2$) have found several uses in several practical applications such as primary batteries, rechargeable batteries, electromagnetic radiation absorption, catalyst, antibacterial effect and sterilization applications. Until recently only micrometer scales particles have been used but some studies indicate that applying sub micrometer scale particles, i.e., oxide nanoparticles several advantages over larger particles can be obtained. Known synthesis and manufacturing methods of making oxide nanoparticles are described to be chemical precipitation, hydrothermal precipitation, flame pyrolysis and mechanical grinding.

Various types of manganese dioxides ($MnO_2$) have been employed as catalysts and especially as electroactive materials in electrochemical capacitors and batteries. This is due to their great abundance, low cost, favorable charge density, high electrochemical and chemical stability and low toxicity. The modern electronic devices, such as digital cameras and cordless tools, require batteries to be better suited for the high-power application. Despite of significant advances in the development and commercialization of new battery systems, the alkaline $Zn/MnO_2$ battery still occupies a major battery market share due to its favorable cost and low toxicity. However, the current commercial alkaline $Zn/MnO_2$ battery that uses electrolytic manganese dioxide as cathode cannot meet the requirements of the new generation of electronic devices in high rate performance. For example, only 30%-40% of the active cathode material in an alkaline $Zn/MnO_2$ battery is utilized in a high-power electronic device.

Therefore, it is necessary to improve the high rate performance of the alkaline $Zn/MnO_2$ battery for the development of new electronic devices.

There are many factors that affect the performance of the alkaline $Zn/MnO_2$ battery. The nature of the cathode plays an important role in the limitation of the performance of the battery compared to other factors. The active material of a cathode used in current alkaline $Zn/MnO_2$ battery is electrolytic manganese dioxide (EMD). The commercial EMD has a relatively small specific surface area (about 40 $m^2/g$). The low specific surface area limits the contact area between the electrolyte and $MnO_2$, leading to a low utilization and rate capacity, especially at a high rate condition. Therefore, increasing the specific surface area of $MnO_2$ is an effective way to improve the performance of the $Zn/MnO_2$ battery. Nanoscale materials have special physical and chemical properties and nanostructure provides the materials with a large surface area. Nano manganese dioxide can be used for various applications, such as molecule/ion sieves, catalysts, magnetic materials, battery materials, supercapacitors, and cathodic electrocatalysts for fuel cells.

A second factor that affects the performance of the alkaline $Zn/MnO_2$ battery is the crystalline phase of the EMD. Manganese oxide has several crystalline phases and ability to control the crystalline phases while simultaneously achieving nanoscale materials is challenging. Up to now, many methods have been proposed for the preparation of nano manganese oxide, including simple reduction, coprecipitation, thermal decomposition, and sol-gel processes. These methods are complicated, usually under wild conditions, and the specific surface area of the products is not much larger than that of the commercial EMD. However, until now EMD cannot produce free and aggregate free nano particulate powders.

The cathode materials for Li-ion batteries are usually oxides of transition metals due to their high electrochemical potentials during highly reversible lithium insertion/deinsertion. There is literature available on the preparative, structural, and electrochemical studies of oxides of Co, Ni, Mn, and V with regard to lithium battery cathodes. Recently, nanoparticles have been suggested as electrode materials for Li batteries. Possible advantages of nanoparticles as active mass in electrodes for Li batteries may relate to high rate capability. Since the rate-determining step in Li insertion electrodes is supposed to be solid-state diffusion (Li ions in the bulk of the active mass), the smaller the particles, the smaller is the diffusion length, and the electrode's kinetics are expected to be faster. The utility of $MnO_2$ compounds in lithium rechargeable batteries was discussed extensively in the past and has also been demonstrated in commercial rechargeable lithium batteries. Reversible Li insertion around 4.1 V (vs Li/Li+), abundance of manganese in the earth's crust, and relatively low toxicity are the advantages of the $LiMn_2O_4$ spinel as compared to lithiated cobalt and nickel oxides. Synthetic routes leading to the formation of $LiMn_2O_4$ published so far include a calcination step at high elevated temperature for long time period as a major and critical step. These methods produce microparticles.

Metal oxide particles find also applications in radiofrequency such as microwave absorption. Microwaves are electromagnetic waves with a frequency range in the electromagnetic spectrum of 300 MHz to 300 GHz. However, most applications of microwave technology make use of frequencies in the range of 1-40 GHz. With the rapid advancements in wireless communications the density of radiofrequency waves and microwaves in our surroundings is becoming a serious problem. Electronic devices such as personal hand phones and personal computers emit electromagnetic waves, causing serious electromagnetic interference phenomena and resulting in wave pollution problems. In order to prevent such phenomena, electromagnetic (EM) waves absorbing materials are generally used.

The use of electromagnetic absorbers can ease this problem and, therefore, absorbers of electromagnetic waves are becoming increasingly important for applications outside special fields like silent rooms, radar systems and military applications. Promising electromagnetic wave absorbers have been widely investigated to eliminate the above problems; in particular, an absorber with a plate structure has become the focus of study because of its practical and simple preparation method. Manganese dioxide ($MnO_2$) is also one of the raw materials of manganese ferrite, which has wide application in military and civil engineering for its excellent wave absorbing performance in lower frequency bands. However, to the best of our knowledge, there are no reported results on the electromagnetic characteristic and wave absorbing mechanism of $MnO_2$ nanoparticulate and in particular electrolytically produced and agglomerate free $MnO_2$ nanoparticle powders.

Beyond above-mentioned electrical applications metal oxide nanoparticles such as $MnO_2$ can also find applications in antibacterial applications due to their high oxidation capability to disrupt the integrity of the bacterial cell envelope through oxidation similar to other antibacterial agents such as ozone and chlorine.

Background art is represented by US 2013199673, CN 102243373, US2012093680 and

SUMMARY

The present invention is related to oxide particles, preferably transition metal oxide particles, made from the application of a voltage across an electrolyte solution. The electrolyte solution includes a transition metal salt in water, and preferably also includes a compound for increasing the electrical conductivity of the electrolyte.

In one embodiment of the invention, a method is provided for making metal oxide particles that includes mixing with water, together or separately, a transition metal salt, and a soluble conductivity enhancing compound, so as to form an electrolyte solution. The electrolyte solution is provided between electrodes, and potentiostatic voltage pulse electrolysis is performed so as to cause the formation of metal oxide particle at one of the electrodes. The metal oxide particles become separated from the first or second electrode back into the electrolytic solution, and are then separated from the electrolytic solution.

The use of potentiostatic pulse electrolysis in a method of making metal oxide particles has not been suggested before in the art.

In another embodiment of the invention, electrolytic metal nanoparticles, such as electrolytic manganese oxide particles (EMD) are provided having a maximum dimension of less than 1 micron, and which are provided in an ink, slurry or paste. In yet another embodiment of the invention, a charge storage device is provided having therein such electrolytic nanoparticles.

The particles made by the processes disclosed herein, can have sizes in the micrometer or nanometer ranges.

The particles are typically crystalline, in particular they exhibit ε and γ phases.

The oxide particles can have a variety of uses, including for charge storage devices. As an example, as indicated above, manganese oxide particles, and methods for making the same, are disclosed for a variety of uses including lithium ion batteries.

DESCRIPTION OF EMBODIMENTS

Figure 1:
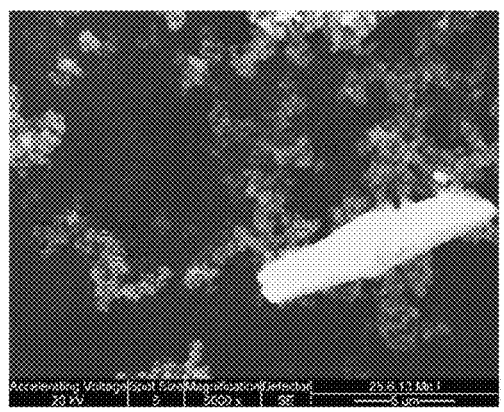
FIG. 1 is an SEM image of $MnO_2$ particles obtained in Example 1.
Figure 2A:
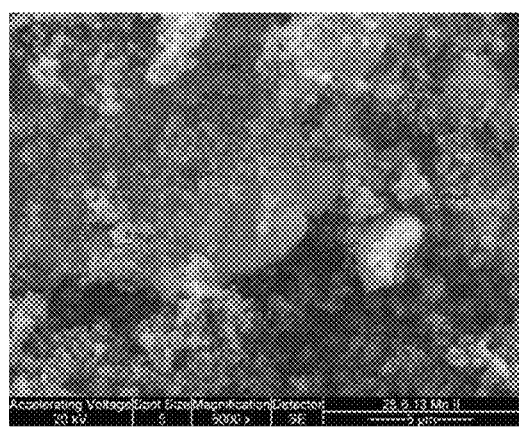
FIGS. 2A and 2B show an SEM image and an EDS plot, respectively, of $MnO_2$ particles obtained in Example 2.
Figure 2B:
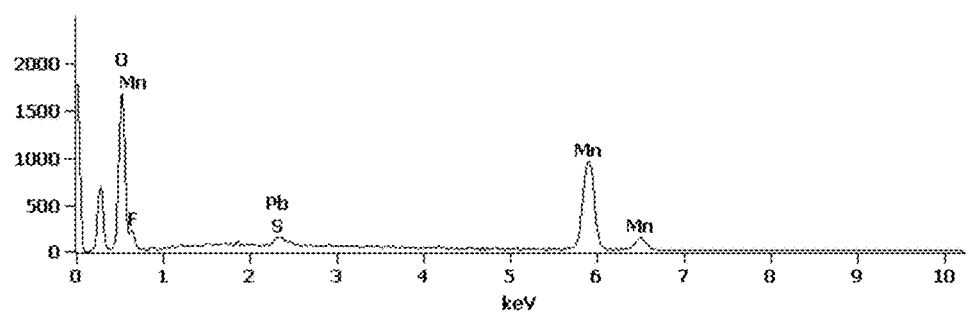

Disclosed herein are methods and apparatus for making particles, such as microparticles, nanoparticles, etc.

The processes in their various variations include first forming an aqueous electrolyte, disposing the electrolyte between electrodes, followed by performing electrolysis by applying a potential across the electrodes so as to form the desired particles. In preferred examples, the electrolyte is an aqueous solution formed by mixing water with a metal salt and a conductivity enhancing compound, followed by applying a voltage across the electrodes and through the electrolyte, which is preferably as a series of voltage pulses. The voltage pulses can be a series of on and off voltages, a series of high and low voltages, a series of forward and reverse voltage pulses, or a combination thereof.

In one example for making oxide particles, an electrolyte solution is formed from a transition metal salt. Preferably a soluble conductivity enhancing compound is also provided to increase the conductivity of the electrolytic solution. Both the transition metal salt and the soluble conductivity enhancing compound can be added to water, or the transition metal salt can be added to a first source of water, and separately the soluble conductivity enhancing compound can be added to another source of water, and then both solutions combined together to form the electrolyte solution.

The transition metal salt can be any desired transition metal compound that is soluble for the process. The transition metal can be a late transition metal, or an early transition metal. The transition metal is preferably a transition metal from columns 4 to 12 of the periodic table. The transition metal can be any suitable transition metal, though preferably selected from rows 4 to 6 of the periodic table. In one example, the transition metal is selected from row 4 of the periodic table, such as Ti, V, Cr, Mn, Fe, Co, Ni, Cu or Zn. The transition metal could also be selected from row 5 of the periodic table, such as, but not limited to Zr, Nb, Mo, Tc, Ru or Rh. The transition metal salt can be for example a compound that is a nitrate, sulphate, carbonate, phosphate or halogen salt.

The soluble conductivity enhancing compound is a compound that is soluble in the electrolytic process for making the oxide particles. As an example, the conductivity enhancing compound is an acid, such as sulphuric acid, nitric acid, a chlorine containing acid, phosphoric acid or carbonic acid. The conductivity enhancing compound can be a halogen containing salt or acid.

In a preferred example, the conductivity enhancing compound is a polar covalent compound, such as HCl, HBr, HI or $H_2SO_4$. In one example, the transition metal salt and the conductivity enhancing salt are both nitrates or both sulphates. In another example, the transition metal salt comprises a nitrate, sulphate, carbonate, phosphate or halogen group, and the conductivity enhancing salt comprises a nitrate, sulphate, carbonate, phosphate or halogen group that is different from the nitrate, sulphate, carbonate, phosphate or halogen group of the transition metal salt. Preferably the transition metal salt comprises a nitrate, sulphate, carbonate, phosphate or halogen group, and the conductivity enhancing salt comprises a nitrate, sulphate, carbonate, phosphate or halogen group that is the same as the nitrate, sulphate, carbonate, phosphate or halogen group of the transition metal salt.

If desired, additional compounds or additives can be added to the electrolyte solution. Such compounds may be organic solvents, functional organic compounds, surfactants or polymers that impart in a beneficial way to the electrolysis process. More detailed examples of these classes of compounds can be alcohols, ketones, esters, organic acids, organic sulphur containing compounds, various anionic, cationic or non-polar surfactants, as well as functional polymers. The organic solvent can be acetic acid, glycolic acid, oxalic acid, decanoic acid or octanoic acid, among others. The functional polymers may be, but not limited to, copolymers of ethylene and propylene oxide, polyvinyl alcohols and polyvinylpyrrolidone The particle formed can have a diameter of 1 micron or greater on average (e.g. from 1 to 50 microns, or e.g. from 1 to 10 microns), however the methods are preferably used to form oxide nanoparticles having a diameter (or maximum dimension) of less than 1 micron.

In one embodiment, the particles have an average diameter (or maximum dimension) of from 0.01 to 0.90 microns, and preferably from 0.025 to 0.85, e.g. 0.1 to 0.75 microns, and are substantially round (or spherical).

Another embodiment comprises forming particles having the shapes of elongated rods, thin flakes or petals. Said particles have average largest dimensions in the above mentioned ranges.

Nanoparticles having an average diameter, or maximum dimension, of less than 0.6 microns, e.g. less than 0.5 microns or even less than 0.3 microns, can be made according to the methods herein.

In preferred examples, due to substantial uniformity of the sizes of the particles formed, for a particular average dimension in a range as above, substantially all of the particles formed will have dimensions in such range.

The yield of formed metal oxide particles to the solution can be greater than 40%, preferably greater than 50%, including yields of 65% or more (up to 100%, or more commonly 99%).

The pH of the electrolyte during the particle formation is preferably acidic, e.g. a pH of less than 7, such as a pH of from 1 to 6. A pH in the lower part of this range, such as from 1 to 4, or from 1 to 2.5, e.g. from 1 to 2, can be desirable. The temperature of the electrolyte during particle formation can be selected from a variety of temperatures, such as an electrolyte solution heated to a temperature of from 50° C. to 90° C. during particle formation, or from 60° C. to 80° C. during particle formation. However temperatures both lower and higher than these ranges, including less than 50° C., such as at ambient temperature or lower, can be used.

In one example, the conductivity enhancing compound is a polar covalent compound, such as HCl, HBr, HI, $HNO_3$ or $H_2SO_4$. It is also possible to use an alkali metal salt for the conductivity enhancing compound, or an alkaline earth metal salt. In such a case the alkali metal could be K or Na, or the alkaline earth metal could be Mg or Ca. Such a salt could also have an ion (anion) selected from $NO_3$, $SO_4$, $PO_4$, $BO_3$, $ClO_4$, $(COOH)_2$ and halogen groups.

The potentiostatic pulse electrolysis may include a series of voltage pulses provided from a power source, where the voltages are applied between an anode and cathode. The voltage pulses can include both forward and reverse pulses.

In one example, only one or more forward pulses are provided across the electrodes, without any reverse pulses. However in a preferred example, both one or more forward pulses and one or more reverse voltages are provided.

In one example, a plurality of forward pulses is followed by a plurality of reverse pulses.

In another example, a plurality of forward pulses is followed by a single reverse pulse.

In a third example, a single forward voltage pulse is followed by a plurality of reverse pulses.

In a preferred example, a plurality of both forward and reverse pulses is provided, where each forward pulse is followed by a reverse pulse.

In one example, a forward voltage pulse has a voltage, and optionally a reverse pulse, of 0.5 to 5 $V/cm^2$ and a current of from 0.01 to 5 $A/cm^2$. The forward voltage pulse is preferably followed by a reverse pulse having a voltage of from 0.01 to 5 $A/cm^2$.

In another example, a forward voltage pulse has any desired voltage, such as a voltage pulse of from 0.25 to 25 $V/cm^2$, and preferably from 2 to 15 $V/cm^2$, and a current of from 0.01 to 5 $A/cm^2$, preferably from 0.1 to 5 $A/cm^2$. This forward voltage pulse is followed by a reverse pulse having a voltage of from of from 0.25 to 25 $V/cm^2$, and preferably from 2 to 15 $V/cm^2$, and a current of from 0.1 to 5 $A/cm^2$, preferably from 0.1 to 5 $A/cm^2$, but of opposite polarity from the forward pulse.

The forward and reverse pulses can be of the same magnitude, or the reverse pulse can be higher or lower than the forward pulse. In a number of examples, the reverse pulse is of lesser magnitude than the forward pulse, such as from 15% to 85% of the magnitude of the forward pulse. Also the length of time of the forward pulses need not be of the same duration throughout the electrolysis, nor do the reverse pulses need to be maintained at the same duration throughout the electrolysis, The forward pulses can be of shorter time duration at an earlier time in the electrolysis process than at a later time (or vice versa). Likewise the reverse pulses can be of shorter time duration at an earlier time in the electrolysis process than at a later time (or vice versa). In addition, the forward pulses and reverse pulses can have the same pulse duration or time width, or the reverse pulses can have a pulse duration different than the pulse duration of the forward pulses (either greater or less than the forward pulses) and this relation or ratio can change during the electrolysis process.

Additionally, there may be a pulse delay between the pulses when no current is being applied in to the electrolytic cell. Such delays may be useful to permit the detachment of growing particles from the anode or cathode, respectively. The pulse delay can be shorter or longer that the forward or reverse pulses. Preferably, the pulse delays should be short to maximize the production yield of the process.

Though the oxide particles can be formed at either the cathode or anode, in a preferred process the particles are formed at the anode, which can be any suitable electrode design including an ultramicroelectrode. The anode can be stainless steel, aluminium or lead anode, or an anode of any other suitable material such as copper or platinum. An ultrasonic or megasonic pulsator may optionally be provided, such as set forth in FIG. 1, in order to provide ultrasound to the electrolyte. The ultrasonic device can provide sound pressure waves with a frequency of from 20 kilohertz to 200 megahertz.

The potentiostatic pulse electrolysis as a production method for oxide particles permits control of the particle crystallinity obtained. Using the method described, it is possible to obtain, for example, a manganese oxide nano sized material which contains to a significant degrees and γ phase. The crystallinity and the phase morphology can further be controlled by adjusting the parameters of the process.

Figure 4:
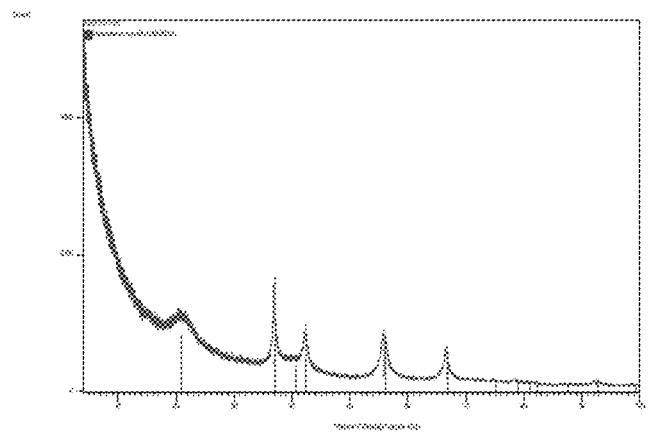
FIG. 4 depicts the XRD result of the $MnO_2$ particles obtained in Example 4.
Figure 5:
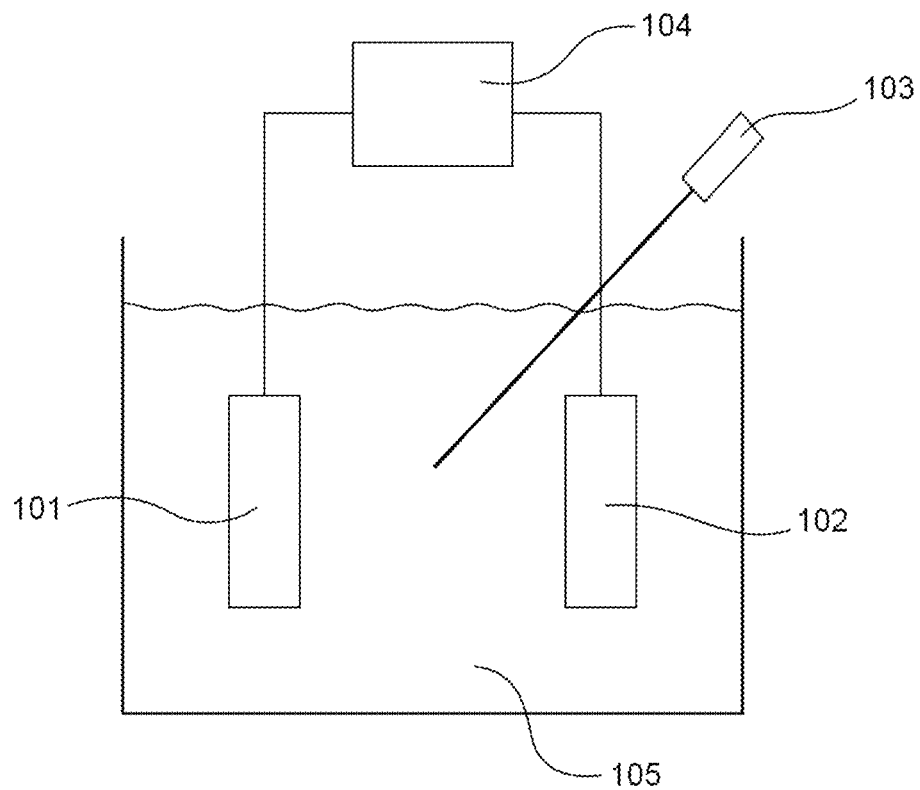
FIG. 5 shows in a schematic fashion a synthesis device which can be used in the present technology.

Thus, the present method provides for predominantly crystalline nanoparticles of metal oxides, such as manganese oxide, having ε and γ phases. Such particles may have particle sizes in the range of less than 1 micron, in particular 0.01 to 0.90 microns, and preferably from 0.025 to 0.85, e.g. 0.1 to 0.75 microns. The size is expressed as the average diameter or average maximum size of the particles (Ø). A typical XRD spectrum for the particles is shown in FIG. 4.

By contrast, simple chemical reduction of $MnSO_4$ with $KMnO_4$ leads to a predominately amorphous material containing some crystalline α-phase.

Thus, it can be estimated that the present technology provides crystalline metal oxide particles having a higher degree of crystallinity than particles formed by conventional technology. On an average, the non-crystalline portion of the present particles is less than 50% of the mass, in particular less than 40%, for example less than 30%, advantageously less than 20% or even less than 10% of the mass of the particles.

Preferably the oxide particles are formed at the anode and separate from the anode back into solution after a short period of time. In one example, the oxide particles are disposed on the surface of the anode for less than 1 second, preferably less than 0.5 seconds, and more preferably less than 0.1 seconds. In other examples, the oxide particles separate from the anode within milliseconds of formation, such as within 0.01 to 100 milliseconds, e.g. from 1 to 100 milliseconds or even for periods of time such as from 0.01 to 1 milliseconds. Depending on the length of time of the voltage pulse widths, the oxide particles can be at the surface of the anode for from 1 to 100 pulse time widths, e.g. from 1 to 10 pulse time widths. Preferably all the metal oxide formed at the electrode separates as particles into the electrolyte with substantially no metal oxide remaining adhered to the electrode.

The oxide particles formed can be metalloid oxide particles, though preferably are transition metal oxide particles such as oxide particles of Ce, Zr, Zn, Co, Fe, Mg, Gd, Ti, Sn, Ru, Mn, Cr or Cu. Other oxide particle examples include $ZnO$, $In_2O_3$, $RuO_2$, $IrO_2$, $CrO_2$, $MnO_2$ and $ReO_3$. Oxides of post transition metals are also examples herein, though oxides of transition metals are preferred examples, with transition metals from columns 3 to 12 and in rows 4 to 6 of the periodic table of elements are preferred (particularly columns 5 to 12 and row 4 of the periodic table).

After formation of the particles, the particles can be separated from the electrolyte solution, such as with a suitable filter or by allowing the particles to separate out over a period of time by gravitational forces, centrifugation, etc. Furthermore separating the formed free flowing particles from the electrolyte may comprise an additional hydrocyclone or decanting centrifuge separation step either in batch or continuous mode.

After removing the remaining electrolyte solution from the formed particles, the particles can be washed with e.g. deionized water and dried. The particles can then be formulated as a slurry, ink or paste with one or more suitable carriers. Examples of this carrier are water and various organic solvents having 1-10 carbon atoms and one or more functional moiety. Examples of such are alcohol, ether, ketone, halogen, ester, alkane, double bond or aromaticity in the molecule. The carrier solvent molecule may bear one or more of the functional groups.

The final formulation may further consist of more than one carrier solvent i.e. consist of a mixture of chemicals beneficial for a particular application. In addition, the final composition may include various surfactants, polymers or organic acids which permit the particles to perform as expected in their application.

A charge storage device is a further embodiment, wherein a housing comprises a first electrode, a second electrode, and wherein one of the electrodes comprises a material made from the oxide particles disclosed herein. The oxide particles used for making the electrode material in the charge storage device can have a size of from 1 to 10 microns in diameter (or maximum dimension). However, as greater surface area is beneficial for the oxide particles at the electrode in the charge storage device, the particles preferably have an average diameter or maximum dimension of less than 1 micron, such as less than 800 nm, e.g. from 0.2 to 0.7 microns.

In a further example, the particles have an average diameter (or maximum dimension) of from 50 to 850 nm, e.g. from 100 to 700 nm. Preferably the particles are substantially round, rather than elongated rods or flakes.

The charge storage device can be a lithium ion battery that can be rechargeable (or not). It could also be another type of battery such as an alkaline battery. Between the anode and cathode of the charge storage device is an electrolyte comprising a lithium salt and a solvent. The solvent can be an organic solvent such as ethylene carbonate, propylene carbonate, dimethyl carbonate, ethyl methyl carbonate and/or diethyl carbonate.

The anode in the charge storage device can be made of carbon, such as a graphite anode. The cathode in the charge storage device can be a spinel cathode, and can comprise for example a lithium manganese oxide spinel ($LiMn_2O_4$) made from the manganese oxide particles disclosed herein. Alternatively the oxide particles disclosed herein could be cobalt oxide particles for making a lithium cobalt oxide cathode, or oxide particles for making a lithium nickel manganese cobalt oxide electrode (e.g. a NMC spinel), or oxide particles for making a lithium nickel cobalt aluminium electrode. Preferably the formed electrode has a capacity of at least 175 mAh $g^{-1}$, preferably at least 200 mAh $g^{-1}$, and more preferably at least 250 mAh $g^{-1}$.

Preferably the oxide is substantially free of metallic impurities. The lithium salt in the electrolyte can be $LiPF$, $LiBF$, $LiClO$ or other suitable salt. If the charge storage device is a rechargeable lithium battery, the lithium in the electrolyte can be an intercalated lithium compound. A suitable lithium salt in the battery electrolyte, such as lithium triflate, lithium hexafluorophosphate, lithium perchlorate, lithium tetrafluoroborate, or lithium hexafluoroarsenate monohydrate, or other suitable lithium salt, can be used.

The charge storage device may be equipped with a voltage regulator or temperature sensor as desired. The charge storage device can be a rechargeable lithium ion battery in an electric vehicle, or in a portable electronic device such as a cellular phone or smartphone, laptop, netbook, ebook reader, iPad or Android tablet, etc.

The metal oxide particles can be also coated with additional material layers such as graphite, graphene, another metal oxide (e.g., titanium dioxide) or with metal layer such as silver, nickel, copper or their oxides or gold, platinum and palladium.

The metal oxide may be blended or compounded in various ratios to polymer resins such as siloxanes, acrylates, epoxies, urethanes but not limited to these. Metal oxide containing resin may then be extruded or coated to function as electromagnetic absorber or antibacterial surface. For the antibacterial surface application it is also beneficial that the resin material is porous or partially porous.

Embodiments are further illustrated by the following non-limiting examples.

EXAMPLES

Comparative Example 1

An electrolyte based on $MnSO_4.H_2O$ (0.43 g, 2.5 mmol) and sulphuric acid (0.25 g, 2.6 mmol) in 249.32 g deionized water was prepared in a 300 ml beaker. Two stainless steel plates (width 50 mm, thickness 1 mm) were immersed in the electrolyte to a depth of 50 mm. The stainless steel plates were connected to a potentiostat and a pulsed current was applied for synthesis of $MnO_2$ particles. The forward pulse voltage and current were 14.97V and 0.67 A, while the same for the reverse 9.97V and 0.88 A. No formation of particles or films or either electrode was observed. Comparative example 2. The experiment in comparative example 1 was repeated by replacing the stainless steel anode with an aluminum sheet of equivalent size (width 50 mm, thickness 1 mm, immersed to 50 mm). The forward pulse voltage and current were 14.96V and 0.08 A, while the same for the reverse 9.97V and 0.67 A. No formation of particles or films or either electrode was observed.

Example 1

The experiment in comparative example 1 was repeated by replacing the stainless steel anode with a lead sheet of approximately equivalent size (width 50 mm, thickness 1 mm, immersed to 50 mm). The forward pulse voltage and current were 14.96V and 0.59 A, while the same for the reverse 9.97V and 0.93 A. The synthesis was carried out for 5 min and the initially clear and colorless solution obtained a dark color due to the formation of solid particles in the solution. The particles settled to the bottom of the vessel they were stored in two days. The clear electrolyte was decanted from the particles and then the particles were re-dispersed into deionized water, allowed to settle, collected and dried. SEM images confirmed that submicron particles were obtained.

Example 2

The experiment in Example 1 was repeated using an electrolyte based on $MnSO_4.H_2O$ (1.29 g, 7.6 mmol) and sulphuric acid (0.75 g, 7.7 mmol) in 247.96 g deionized water. The forward pulse voltage and current were 9.98V and 0.84 A, while the same for the reverse 4.98V and 1.01 A. The synthesis was carried out for 7 min and the initially clear and colorless solution obtained a dark color due to the formation of solid particles in the solution. The particles settled to the bottom of the vessel they were stored in two days. The clear electrolyte was decanted from the particles and then the particles were re-dispersed into deionized water, allowed to settle, collected and dried. According to SEM images the particles were sub-micron sized.

Example 3

Figure 3A:
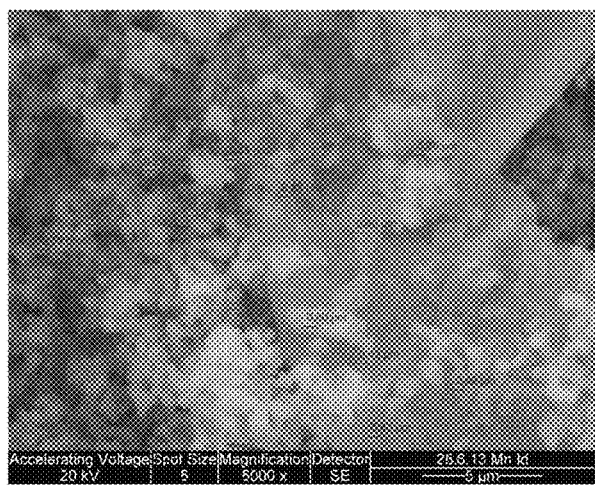
FIGS. 3A and 3B show an SEM image and an EDS plot, respectively, of $MnO_2$ particles obtained in Example 3.
Figure 3B:
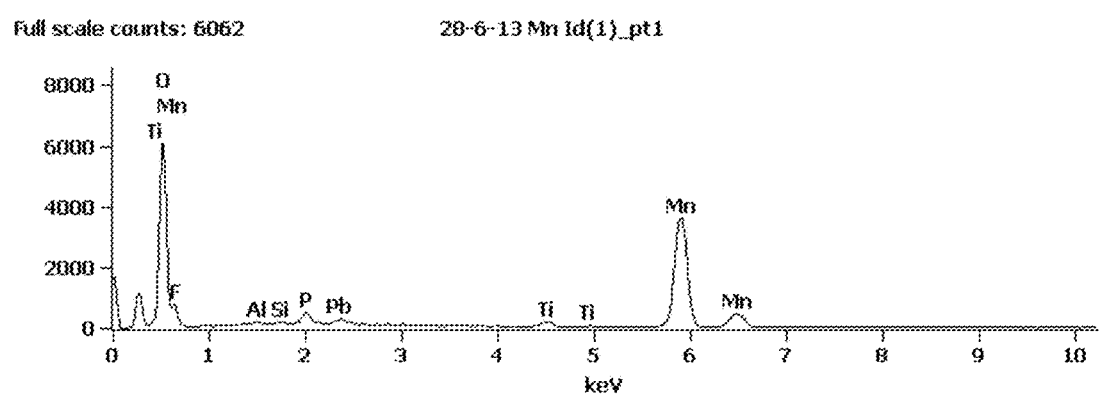

The experiment in Example 1 was repeated using an electrolyte based on $MnSO_4.H_2O$ (1.29 g, 7.6 mmol) and sulphuric acid (0.75 g, 7.7 mmol) in 247.96 g deionized water. The forward pulse voltage and current were 6.98V and 1.01 A, while the same for the reverse 1.98V and 1.18 A. The synthesis was carried out for 15 min and the particles were collected as previously. According to the SEM images (cf. FIG. 3) the particles were sub-micron sized.

Example 4

The experiment in Example 2 was repeated using electrodes of size 256 $cm^2$. The forward pulse voltage and current were 11.983V and 8.03 A, while the same for the reverse 8.96V and 9.83 A. The synthesis was carried out for 2 hours and the particles were collected as previously. According to SEM images the particles were sub-micron sized showing that the process is scalable. XRD of the materials confirmed that the material was crystalline (FIG. 4)

Example 5

The experiment in Example 2 was repeated using an electrolyte based on $MnSO_4.H_2O$ (2.6 g, 15.2 mmol) and sulphuric acid (1.5 g, 15.4 mmol) in 245.9 g deionized water. The forward pulse voltage and current were 4.69V and 1.01 A, while the same for the reverse 2.48V and 2.11 A. The initially clear and colorless solution obtained a dark color which turned clear after 1 h. A solid precipitate was found at the bottom of the electrolytic cell have particles with larger size than in Example 2.

Example 6

The experiment in Example 5 was repeated using a forward pulse voltage and current were 9.49V and 3.13 A, while the same for the reverse 12.47V and 6.52 A. The initially clear and colorless solution very rapidly obtained a dark color. According to SEM images the particles were sub-micron sized showing that the process can be accelerated by increase of current.

Example 7

The $MnO_2$ nanoparticles of the Example 1 were coated with silver by mixing the powder with silver nitrate in ethanol and stirring the solution vigorously for 4 hours at room temperature. The silver coated particles were separated and dried. The silver coated $MnO_2$ powder was then calcinated at elevated temperature. Alternatively $MnO_2$ particles can be treated first with $SnCl_2$ or $SnCl_2/PdCl_2$ treatment sequence prior silver nitrate treatment process.

REFERENCE SIGNS LIST

101=cathode,
102=anode
103=optional ultrasonic pulsator
104=potentiostat
105=electrolyte

CITATION LIST

Patent Literature

D1 US2013199673
D2 CN 102243373
D3 US2012093680
D4 WO0027754

The invention claimed is:
1. A method for making metal oxide particles, comprising the steps of:
   mixing with water, together or separately,
   a) a transition metal salt, and
   b) a soluble conductivity enhancing compound
   so as to form an electrolyte solution, the electrolyte solution being provided between electrodes; and
   applying potentiostatic pulse electrolysis to the solution so as to cause the formation of metal oxide particles at the first or second electrode, wherein the metal oxide particles become separated from the first or second electrode back into the electrolytic solution, wherein the oxide particles are disposed on the surface of the electrode for less than 1 second; and separating the metal oxide particles from the electrolytic solution.

2. The method of claim 1, wherein the metal oxide formed is selected from ZnO, $In_2O_3$, $RuO_2$, $IrO_2$, $CrO_2$, $MnO_2$ and $ReO_3$.

3. The method of claim 1, wherein the metal oxide formed is a metal oxide of one or more of the metals selected from Ce, Zr, Zn, Co, Fe, Mg, Gd, Ti, Sn, Ru, Mn, Cr and Cu.

4. The method of claim 1, wherein the first and second electrodes are an anode and cathode, and wherein the metal oxide particles are formed on the anode and decouple from the anode so as to become free nanoparticulates in the electrolytic solution.

5. The method of claim 1, wherein the metal oxide particles formed are manganese oxide particles.

6. The method of claim 1, wherein the potentiostatic pulse electrolysis comprises a series of voltage pulses applied between the electrodes.

7. The method of claim 1, further comprising applying ultrasound to the electrolytic solution during potentiostatic pulse electrolysis.

8. The method of claim 4, wherein the anode is an array and comprises a plurality of electrodes.

9. The method of claim 1, wherein the potentiostatic pulse electrolysis comprises a series of voltage pulses having a pulse width of less than 1 second.

10. The method of claim 1, further comprising the step of separating the metal oxide particles from the electrolyte solution by filtering wherein, prior to said filtering, all of the metal oxide formed are particles in solution.

11. The method of claim 10, wherein substantially all the metal oxide formed at the electrode separates as particles into the electrolyte with no metal oxide remaining adhered to the electrode.

12. The method of claim 1, wherein the electrolyte has a pH of from 1 to 2 and an electrical conductivity of from 5 to 15 mS/cm.

13. The method of claim 1, wherein the formed metal oxide is further coated with silver, copper, nickel, titanium, silver oxide, copper oxide, titanium oxide, graphene, graphite, carbon nano tube, gold, platinum or palladium.

14. The method of claim 1, further comprising forming crystalline metal oxide particles.

15. The method of claim 1, wherein the potentiostatic pulse electrolysis comprises a series of voltage pulses provided between the electrodes, including forward and reverse voltage pulses.

16. The method of claim 1, wherein the step of separating the metal oxide particles from the electrolytic solution comprises allowing the particles to settle out of the electrolytic solution over a period of time, followed by removal of the electrolytic solution, and washing and drying of the remaining particles.

17. The method of claim 1, wherein the metal oxide particles separated from the electrolytic solution have an average diameter of less than 10 microns.

18. The method of claim 1, wherein the particle separation is caused by a delay between pulses.

* * * * *